US010351051B1

(12) United States Patent
Duncan et al.

(10) Patent No.: US 10,351,051 B1
(45) Date of Patent: **\*Jul. 16, 2019**

(54) VEHICLE SPOTLIGHT WITH TRACKING FEATURE

(71) Applicant: Ford Global Technologies, LLC, Dearborn, MI (US)

(72) Inventors: Jeffrey Paul Duncan, Brighton, MI (US); Doug H. Randlett, Metamora, MI (US); Paul Kenneth Dellock, Northville, MI (US); Douglas Miller, Redford, MI (US); Christopher Charles Hunt, Livonia, MI (US); Stuart C. Salter, White Lake, MI (US); Chad Hoover, Washington, MI (US); Matthew Cramer Mullen, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,725

(22) Filed: Feb. 26, 2019

Related U.S. Application Data

(62) Division of application No. 15/700,627, filed on Sep. 11, 2017.

(51) Int. Cl.
*G08B 5/00* (2006.01)
*B60Q 1/24* (2006.01)
(Continued)

(52) U.S. Cl.
CPC ............ *B60Q 1/245* (2013.01); *B60Q 1/0023* (2013.01); *B60Q 1/0082* (2013.01); *B62D 1/046* (2013.01);
(Continued)

(58) Field of Classification Search
CPC .... B60Q 1/245; B60Q 1/0023; B60Q 1/0082; B60Q 2400/00; B60Q 2900/30;
(Continued)

(56) References Cited

U.S. PATENT DOCUMENTS 3,789,358 A * 1/1974 Ellis .................... B60Q 1/2611
224/329
5,673,050 A * 9/1997 Moussally .......... G01S 13/0209
342/22
(Continued)

FOREIGN PATENT DOCUMENTS

AU           5348200 A      2/2001
CN         202080182 U     12/2011
(Continued)

*Primary Examiner* — Munear T Akki
(74) *Attorney, Agent, or Firm* — Vichit Chea; Price Heneveld LLP

(57) ABSTRACT

A vehicle lighting system is provided herein. A spotlight is coupled to a vehicle and is configured to project light in a target direction. A controller is configured to wirelessly send command signals to the spotlight. A user-input device is in communication with the controller and is provided on a steering wheel of the vehicle. The command signals are based on user-input and control at least one of an aim direction and a light activation of the spotlight.

12 Claims, 4 Drawing Sheets

(51) Int. Cl.
  *B60Q 1/00* (2006.01)
  *F21V 5/04* (2006.01)
  *F21V 21/30* (2006.01)
  *F21V 15/01* (2006.01)
  *B62D 1/04* (2006.01)
  *F21V 21/15* (2006.01)

(52) U.S. Cl.
  CPC ............... *F21V 5/04* (2013.01); *F21V 15/01* (2013.01); *F21V 21/15* (2013.01); *F21V 21/30* (2013.01); *B60Q 2400/00* (2013.01); *B60Q 2900/30* (2013.01)

(58) Field of Classification Search
  CPC . B62D 1/046; F21V 5/04; F21V 15/01; F21V 21/15; F21V 21/30
  See application file for complete search history.

(56) References Cited

U.S. PATENT DOCUMENTS

| | | | |
|---|---|---|---|
| 6,191,547 B1 * | 2/2001 | Fricke | B60Q 1/245 |
| | | | 318/17 |
| 7,551,102 B1 | 6/2009 | Carson | |
| 7,748,127 B1 * | 7/2010 | Cosimano | G01C 15/002 |
| | | | 33/286 |
| 8,274,226 B1 | 9/2012 | Sikora et al. | |
| 8,408,765 B2 * | 4/2013 | Kuhlman | B60Q 1/085 |
| | | | 362/488 |
| 8,672,515 B2 | 3/2014 | Anderson et al. | |
| 9,423,090 B1 | 8/2016 | Deyaf et al. | |
| 9,499,095 B1 | 11/2016 | Buehler et al. | |
| 9,718,395 B1 * | 8/2017 | Deyaf | B60Q 1/245 |
| 2002/0074523 A1 * | 6/2002 | Machi | B64D 47/04 |
| | | | 250/495.1 |
| 2004/0012360 A1 | 1/2004 | Yuen | |
| 2007/0040109 A1 * | 2/2007 | Schwartz | B60Q 1/0023 |
| | | | 250/221 |
| 2013/0300556 A1 * | 11/2013 | Wang | B60Q 1/245 |
| | | | 340/471 |
| 2014/0354423 A1 * | 12/2014 | Luei | G08B 5/002 |
| | | | 340/468 |
| 2015/0168931 A1 | 6/2015 | Jin | |
| 2017/0273159 A1 * | 9/2017 | Akselrod | B60Q 1/143 |
| 2017/0368984 A1 * | 12/2017 | Salter | F21S 41/00 |

FOREIGN PATENT DOCUMENTS

| | | |
|---|---|---|
| CN | 202691844 U | 1/2013 |
| CN | 103481814 A | 1/2014 |
| CN | 103542346 A | 1/2014 |
| CN | 104869728 A | 8/2015 |

* cited by examiner

VEHICLE SPOTLIGHT WITH TRACKING FEATURE

CROSS-REFERENCE TO RELATED APPLICATION

This application is a divisional of and claims priority to U.S. patent application Ser. No. 15/700,627, filed on Sep. 11, 2017, entitled "VEHICLE SPOTLIGHT WITH TRACKING FEATURE," the disclosure of which is hereby incorporated herein by reference in its entirety.

FIELD OF THE INVENTION

The present invention generally relates to lighting systems of a vehicle, and more particularly, to vehicle lighting systems having a spotlight.

BACKGROUND OF THE INVENTION

Vehicle spotlights, such as those employed by law enforcement are typically mounted to an A-pillar of a vehicle. To allow the spotlight to be aimed, a user-operated handle is connected thereto and is fed into a passenger compartment of the vehicle by drilling a hole into the A-pillar. Undesirably, in situations where the operator is driving the vehicle and needs to aim the spotlight, the operator must take his or her hand off the steering wheel in order to manipulate the handle. As such, there is a need for a vehicle lighting system that is capable of automatically controlling a spotlight while also offering manual control without requiring a user to give up control of the steering wheel. The present disclosure is intended to satisfy this need.

SUMMARY OF THE INVENTION

According to a first aspect of the present invention, a vehicle lighting system is provided. A spotlight is coupled to a vehicle and is configured to selectively project a light beam, a search beam, and a laser beam in a target direction. A plurality of wireless communication transceivers are configured to communicate with one or more remote devices external to the vehicle. A controller is configured to wirelessly send command signals to the spotlight based on input from the wireless communication transceivers.

Embodiments of the first aspect can include any one or a combination of the following features:
  the light beam and the laser beam are visible, and the search beam is invisible;
  the laser beam coincides with a beam axis of the search beam and highlights a centerpoint of the search beam;
  the spotlight includes a lens secured to a lamp head and the lamp head is configured to rotate so as to shield a lens of the spotlight from oncoming debris;
  the command signals prompt the spotlight to track one of the remote devices and to project at least one of the light beam, the search beam, and the laser beam toward the one of the remote devices; and
  the command signals prompt the spotlight to track whichever remote device is located inside the search beam and is closest to the vehicle, and to project at least one of the light beam, the search beam, and the laser beam toward the remote device.

According to a second aspect of the present invention, a vehicle lighting system is provided. A spotlight is coupled to a vehicle and is configured to project an invisible search beam in a target direction. A plurality of wireless communication transceivers are configured to communicate with one or more remote devices external to the vehicle. A controller is in communication with the wireless communication transceivers and is configured to wirelessly control the spotlight to track one of the remote devices.

Embodiments of the first aspect can include any one or a combination of the following features:
  the spotlight is further configured to project a visible laser beam that coincides with a beam axis of the search beam and highlights a centerpoint of the search beam;
  the spotlight is further configured to project a visible light beam, the light beam and the search beam having a common beam axis and a variable beam angle;
  the one of the remote devices corresponds to a remote device located inside the search beam and closest to the vehicle; and
  the spotlight includes a lens secured to a lamp head and the lamp head is configured to rotate so as to shield a lens of the spotlight from oncoming debris.

According to a third aspect of the present invention, a vehicle lighting system is provided. A spotlight is coupled to a vehicle and is configured to project light in a target direction. A controller is configured to wirelessly send command signals to the spotlight. A user-input device is in communication with the controller and is provided on a steering wheel of the vehicle. The command signals are based on user-input and control at least one of an aim direction and a light activation of the spotlight.

Embodiments of the first aspect can include any one or a combination of the following features:
  the light projected from the spotlight includes at least one of a light beam, a search beam, and a laser beam;
  the light beam and laser beam are visible, and the search beam is invisible;
  the laser beam coincides with a beam axis of the search beam and highlights a centerpoint of the search beam;
  the light beam and the search beam have a common beam axis and a variable beam angle;
  the spotlight includes a lens secured to a lamp head and the lamp head is configured to rotate so as to shield a lens of the spotlight from oncoming debris;
  further comprising a plurality of wireless communication transceivers configured to communicate with one or more remote devices external to the vehicle;
  the command signals are based on input from the wireless communication transceivers and prompt the spotlight to track one of the remote devices and to project light toward the one of the remote devices; and
  the command signals are based on input from the wireless communication transceivers and prompt the spotlight to track whichever remote device is located inside the search beam and is closest to the vehicle, and to project light toward the remote device.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
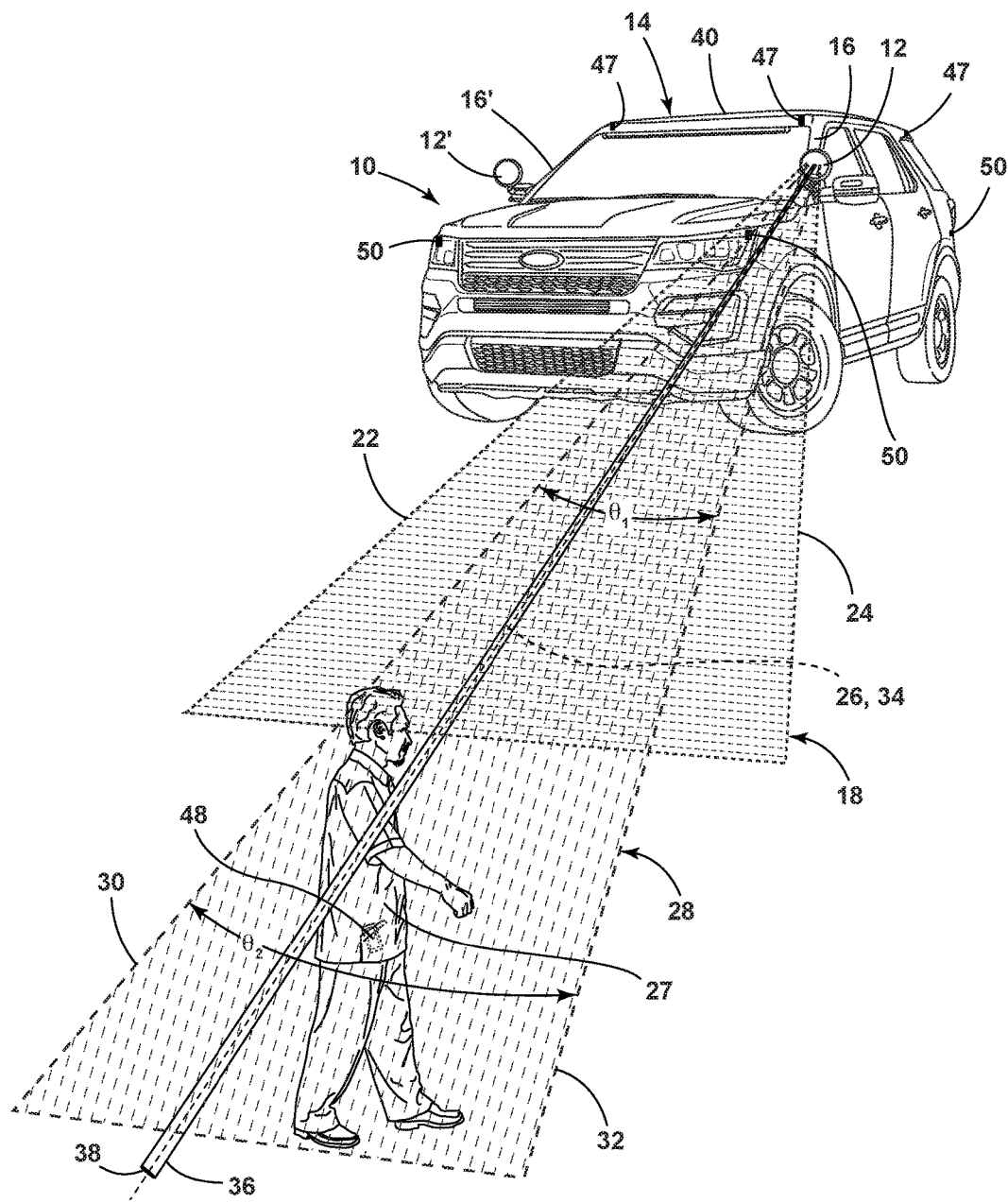
FIG. 1 illustrates a vehicle lighting system having a spotlight provided on a vehicle shown as a police vehicle.

Referring to FIG. 1, a vehicle lighting system 10 is shown. The vehicle lighting system 10 includes a spotlight 12 mounted externally to a vehicle 14 exemplarily shown as a police vehicle. With respect to the depicted embodiment, the spotlight 12 is mounted to a driver side pillar 16 of the vehicle 14. The spotlight 12 is configured to project a light beam 18 in a target direction generally pointing away from the vehicle 14. Depending on the placement of the spotlight 12, the target direction may be forward, to the side, or rearward of the vehicle 14. The light beam 18 is visible and has a variable beam angle $\Theta_1$ corresponding to the angle between beam extents 22 and 24. Beam extents 22 and 24 are opposite one another with respect to a beam axis 26 corresponding to a centerline of the light beam 18. In operation, the light beam 18 typically serves to illuminate one or more objects of interest in the target direction. For example, in the depicted embodiment, the spotlight 12 is aimed such that the light beam 18 illuminates a person 27 of interest who may be in need of assistance, is suspected of committing a crime, etc.

With continued reference to FIG. 1, the spotlight 12 is also configured to project a search beam 28 in the target direction. The search beam 28 is invisible and has a variable beam angle $\Theta_2$ corresponding to the angle between beam extents 30 and 32, which are opposite one another with respect to a beam axis 34 of the search beam 28. The beam axis 34 corresponds to a centerline of the search beam 28 and coincides with the beam axis 26 of the light beam 18. Thus, in some embodiments, the light beam 18 and the search beam 28 share a common beam axis, in some embodiments, the spotlight 12 is further configured to project a narrow laser beam 36 that coincides with the beam axis 26 of the light beam 18 and the beam axis 34 of the search beam 28. The laser beam 36 is visible and is intended to highlight a centerpoint 38 of the light beam 18 and the search beam 28. As shown, the centerpoint 38 lies on the beam axis 26, 34 of the light beam 18 and the search beam 28, respectively. Additionally, the centerpoint 38 is generally equidistant from the beam extents 22, 24 of the light beam 18 and the beam extents 30, 32 of the search beam 28. Typically, the laser beam 36 and the light beam 18 are expressed in different colors to enable visual differentiation therebetween. In embodiments where the search beam 28 is invisible and/or narrow, the provision of the laser beam 36 enables a user to more accurately aim the search beam 28 in a desired direction. While the light beam 18, search beam 28, and laser beam 36 are shown to project at different ranges from the spotlight 12, it will be understood that they may alternatively project at similar ranges.

Optionally, an additional spotlight 12' may be mounted to a passenger side A-pillar 16' if desired. In alternative embodiments, either of the spotlights 12, 12' may be mounted to a roof structure 40 or other external structure of the vehicle 14.

Figure 2:
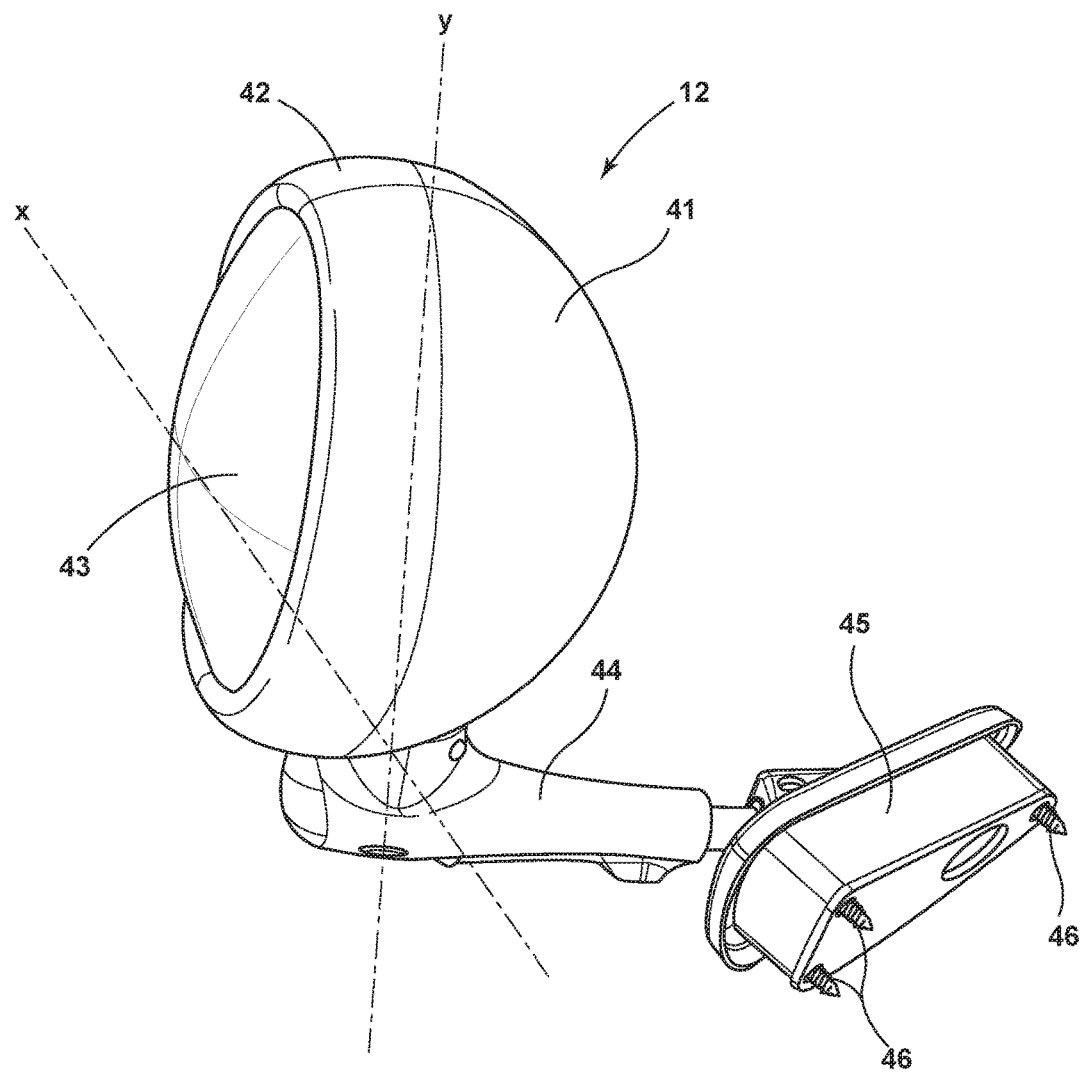
FIG. 2 illustrates an embodiment of the spotlight shown in FIG. 1.

Referring to FIG. 2, the spotlight 12 includes a lamp head 41 having a bezel 42 that holds a lens 43 in place. The lamp head 41 extends vertically from an arm 44 that is connected to an attachment member 45 that is directly affixed to the driver side A-pillar 16 via one or more mechanical fasteners such as screws 46. The lamp head 41 may be configured to rotate about one or more axes. For example, in the depicted embodiment the lamp head 41 is configured for biaxial rotation about an x-axis and a y-axis. Rotation of the lamp head 41 enables light outputted from the spotlight 12 to be aimed in different directions. When the spotlight 12 is not in use, the lamp head may be rotated (e.g., 180 degrees) so as to shield the lens 43 from oncoming debris. As will be described in greater detail herein, operation of the spotlight 12, including the aim direction of the spotlight 12 and the projection of the light beam 18, the search beam 28, and/or the laser beam 36, may be controlled automatically or manually.

Referring back to FIG. 1, the vehicle lighting system 10 includes one or more wireless communication transceivers 47 configured to communicate with a remote device 48 located on the person 27 of interest. The wireless communication transceivers 47 are variously located on the vehicle 14 and may communicate with the remote device 48 over a wireless signal (e.g., radio frequency). In a specific example, the wireless communication transceivers 47 may be a Bluetooth® RN4020 module or an RN4020 Bluetooth® low energy PICtail board configured to communicate with the remote device 48 using Bluetooth® low energy (BLE) signals. The wireless communication transceivers 47 may include a transmitter and a receiver to transmit and receive wireless signals (e.g., Bluetooth® signals) to and from the remote device 48. It will be appreciated that the wireless communication transceivers 47 may utilize other forms of wireless communication with the remote device 48 such as, but not limited to, Wi-Fi®.

In operation, the wireless communication transceivers 47 are capable of communicating with the remote device 48 such that the location of the remote device 48 may be determined. For example, the location of the remote device 48, and by extension, the person 27 of interest, may be triangulated based on signal strength and/or return time of signals between the wireless communication transceivers 47 and the remote device 48. In response, the spotlight 12 may be automatically operated to track the remote device 48 based on ongoing communications between the wireless communication transceivers 47 and the remote device 48. As defined herein, the term "tracking" refers to rotating the lamp head 41 such that any light outputted from the spotlight 12 is projected toward an intended target. It will be understood that in tracking the remote device 48, the spotlight 12 may be operated to project the search beam 28, the light beam 18, the laser beam 36, or any combination thereof.

Additionally or alternatively, the spotlight 12 may be automatically operated based on signals provided by one or more proximity sensors 50 variously located on the vehicle 14. It will be understood that the location of the wireless communication transceivers 47 and the proximity sensors 50 are exemplary in nature. The proximity sensors 50 may be configured as ultrasonic sensors, radar, LIDAR, or other known sensor and are intended to detect objects (e.g., person 27 of interest) proximate the vehicle 14. In response to object detection, the spotlight 12 may be operated to track the detected object and project the light beam 18, the search beam 28, and/or the laser beam 36 toward the detected object.

Figure 3:
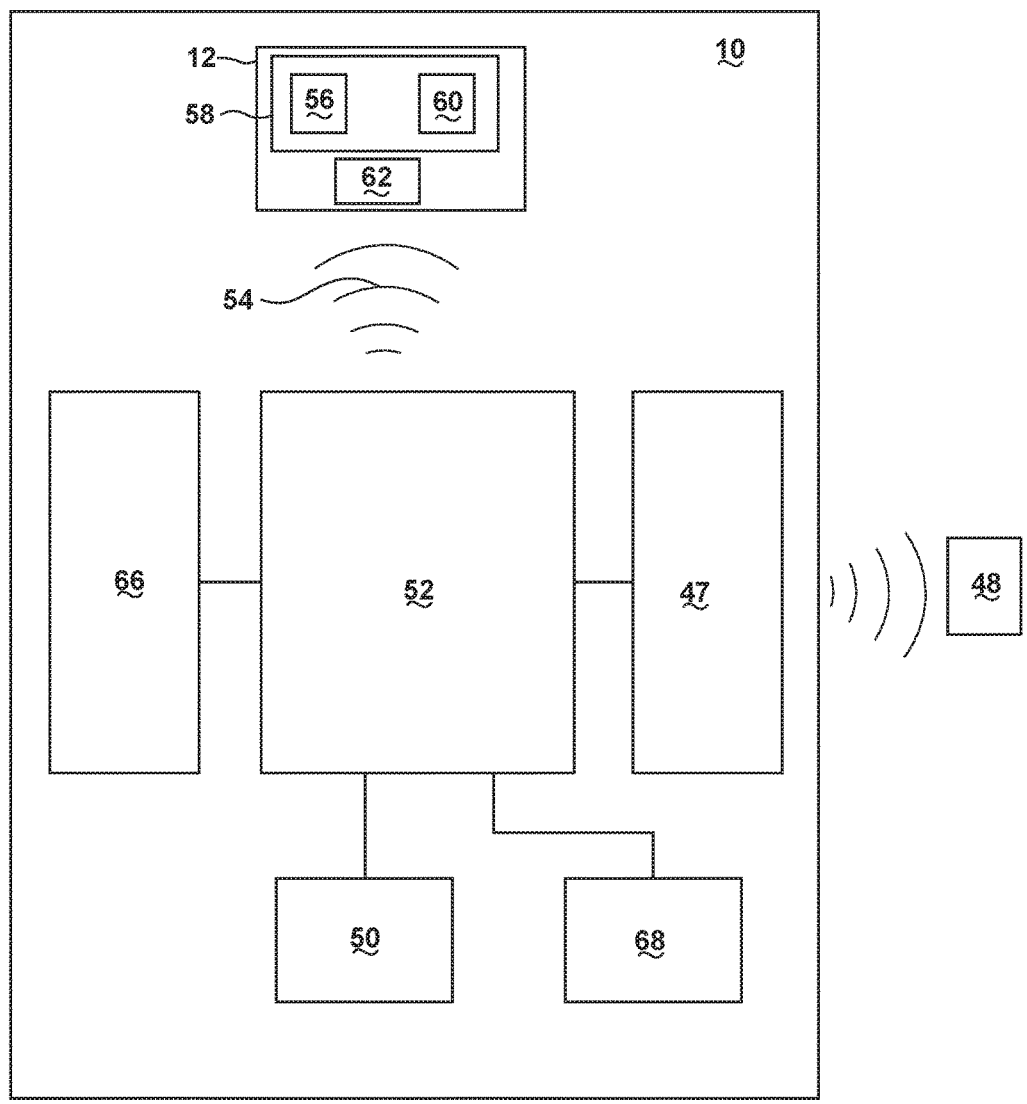
FIG. 3 is a block diagram of the vehicle lighting system.

Referring to FIG. 3, the vehicle lighting system 10 further includes a controller 52 in communication with the wireless communication transceivers 47 and the proximity sensors 50. For example, the controller 52 may be provided onboard the vehicle 14 and is configured to communicate with the wireless communication transceivers 47 and the proximity sensors 50 over a vehicle network such as a CAN bus or a LIN bus. The controller 52 is also configured to wirelessly communicate with the spotlight 12. For example, the controller 52 may wirelessly send command signals 54 to the spotlight 12. The command signals 54 may be in the form of Bluetooth® signals, Bluetooth® low energy signals, Wi-Fi® signals, or other type of wireless signal.

The spotlight 12 may include control circuitry 56 configured to receive the command signals 54 and operate the spotlight 12 accordingly. The control circuitry 56 may be provided on a printed circuit board (PCB) 58 housed inside the lamp head 41. As a space saving measure, a plurality of light sources 60 may also be provided on the PCB 58. The light sources 60 may include an array of light-emitting diodes (LEDs) or other light types known to a skilled artisan. The light sources 60 are optically coupled to the lens 43 and are configured to generate light resulting in the light beam 18, the search beam 28, and the laser beam 36. To impart rotation to the lamp head 41, the spotlight 12 additionally includes one or more motors 62 configured to rotate the lamp head 41 and operably coupled to the control circuitry 56. Based on the command signals 54 received from the controller 52, the control circuitry 56 may operate the motors 62 to adjust the position of the lamp head 41 in order to change the target direction of any light outputted by the spotlight 12. Additionally or alternatively, the command signals 54 may prompt the control circuitry 56 to operate the light sources 60 to selectively project the light beam 18, the search beam 28, and/or the laser beam 36.

Additionally or alternatively, the command signals 54 may be based on input provided by one or more equipment 66 onboard the vehicle 14. For example, the input may include information relating to a gear position of the vehicle 14, that is, whether the vehicle 14 is in park, drive, reverse, neutral, etc. In one specific embodiment, the spotlight 12 is operated in a traffic stop mode, whereby the spotlight 12 is aimed at a rear window of a stopped vehicle at a relatively high intensity (e.g., triple intensity) for a period of time (e.g., 1 minute) to cause glare onto the passenger(s) of the stopped vehicle. In instances where the vehicle 14 is approaching the stopped vehicle at a predetermined speed (e.g., 20 miles per hour or less), the command signals 54 may include positional information provided by the proximity sensors 50 to allow the spotlight 12 to remain aimed at the stopped vehicle despite the vehicle 14 moving in relation to the stopped vehicle.

In another specific scenario, the command signals 54 may prompt the spotlight 12 to project light toward an object approaching the vehicle 14. This feature is helpful in situations where the vehicle 14 is parked and its occupant(s) is not paying attention to the vehicle surroundings. For example, the spotlight 12 may be prompted to project light toward an object detected at a default or predetermined distance from the vehicle 14. In another specific scenario, the command signals 54 may prompt the spotlight 12 to operate as a cornering lamp based on steering input supplied from a steering angle sensor. In yet another specific scenario, the command signals 54 may prompt the spotlight 12 to operate as an auxiliary backup lamp based on the gear position indicating that the vehicle 14 is in reverse.

To enable manual intervention, the vehicle lighting system 10 includes a user-input device 68 located inside the vehicle 14 and operably coupled to the controller 52 such that the command signals 54 sent to the spotlight 12 are based on user-specified input. The user-input device 68 may be variously provided inside the vehicle 14 and is typically provided within arm's reach of the driver. In operation, for example, the user-input device 68 enables a user to aim the spotlight 12, specify an operational mode of the spotlight 12, and/or control operational states of the light beam 18 the search beam 28, and/or the laser beam 36. For example, such operational states may include light activation (e.g., ON/OFF status), intensity, beam range, beam spread, and any other light characteristics associated with beams of light.

Figure 4:
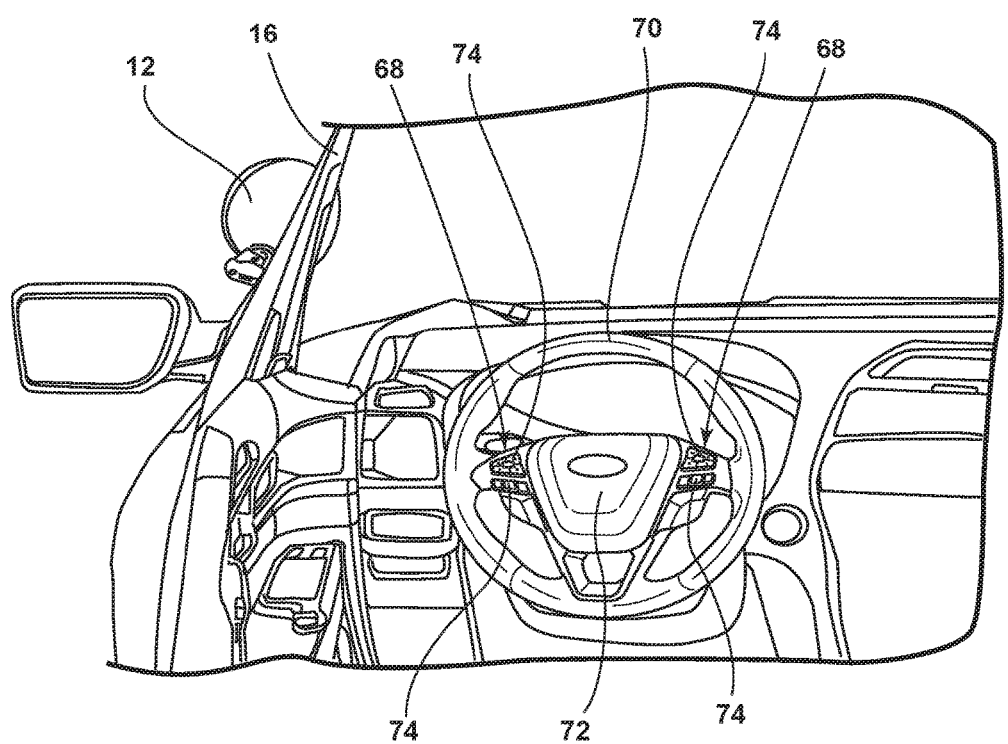
FIG. 4 illustrates one embodiment of a user-input device for controlling the spotlight.

Referring to FIG. 4, the user-input device 68 is shown coupled to a steering wheel 70 of the vehicle 14. As depicted, the user-input device 68 is provided on a face 72 of the steering wheel 60 and includes one or more user-input mechanisms 74 in the form of buttons. In alternative embodiments, the user-input mechanisms may include capacitive switches, dials, sliders, and/or any other known mechanisms for interfacing a human with a machine. By providing the spotlight on the steering wheel 70, a driver of the vehicle 14 may manually control the spotlight 12 without taking his or her hands off the steering wheel 70.

In one specific scenario, the user-input device 68 is used to manually aim the search beam 28 in a target direction. To assist in the aiming of the search beam 28, the laser beam 36 may be activated if desired. Next, the user may specify a target lock feature using the user-input device 68, and in response, the controller 52 detects one or more remote devices within the search beam 28 based on information received from the wireless communication transceivers 47. Additionally or alternatively, objects in the search beam 28 may be detected based on information received from the proximity sensors 50. In some embodiments, the user may relinquish manual control of the spotlight 12 and the controller 52 may automatically operate the spotlight 12 to track a detected object. For example, the controller 52 may send command signals 54 to the spotlight 12 to track the remote device detected inside the search beam 28 and located nearest to the vehicle 14. As the remote device is tracked by the spotlight 12, the light beam 18 may be selectively activated through automatic or manual means.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting system comprising:
   a spotlight coupled to a vehicle and configured to project light in a target direction;
   a controller configured to wirelessly send command signals to the spotlight;

a user-input device in communication with the controller and provided on a steering wheel of the vehicle, wherein the command signals are based on user-input and control at least one of an aim direction and a light activation of the spotlight, wherein light projected from the spotlight towards the target direction of the one or more portable remote devices comprises a search beam and a laser beam that coincides with a beam axis of the search beam and highlights a centerpoint of the search beam; and a plurality of wireless communication transceivers configured to communicate with one or more portable remote devices external to the vehicle.

2. The vehicle lighting system of claim 1, wherein the laser beam is visible and the search beam is invisible.

3. The vehicle lighting system of claim 1 further comprising a light beam, wherein the light beam and the search beam have a common beam axis and a variable beam angle.

4. The vehicle lighting system of claim 1, wherein the spotlight comprises a lens secured to a lamp head and the lamp head is configured to rotate so as to shield a lens of the spotlight from oncoming debris.

5. The vehicle lighting system of claim 1, wherein the command signals are based on input from the wireless communication transceivers and prompt the spotlight to track one of the remote devices and to project light toward the one of the remote devices.

6. The vehicle lighting system of claim 1, wherein the command signals are based on input from the wireless communication transceivers and prompt the spotlight to track whichever remote device is located inside the search beam and is closest to the vehicle, and to project light toward the remote device.

7. The vehicle lighting system of claim 1, wherein the laser beam is activated to assist in aiming the search beam.

8. A vehicle lighting system comprising:
   a spotlight coupled to a vehicle and configured to project light in a target direction;
   a controller configured to wirelessly send command signals to the spotlight;
   a user-input device in communication with the controller and provided on a steering wheel of the vehicle, wherein the command signals are based on user-input and control at least one of an aim direction and a light activation of the spotlight, wherein the light projected from the spotlight towards the target direction of one or more portable remote devices comprises at least one of a search beam and a light beam, and further comprises a laser beam that coincides with a beam axis of the at least one of the search beam and the light beam to assist in aiming the at least one of the search beam and the light beam; and
   a plurality of wireless communication transceivers configured to communicate with one or more portable remote devices external to the vehicle.

9. The vehicle lighting system of claim 8, wherein the spotlight comprises a lens secured to a lamp head and the lamp head is configured to rotate so as to shield a lens of the spotlight from oncoming debris.

10. The vehicle lighting system of claim 8, further comprising the plurality of wireless communication transceivers configured to communicate with the one or more portable remote devices external to the vehicle.

11. The vehicle lighting system of claim 8, wherein the command signals are based on input from the wireless communication transceivers and prompt the spotlight to track one of the remote devices and to project light toward the one of the remote devices.

12. The vehicle lighting system of claim 8, wherein the command signals are based on input from the wireless communication transceivers and prompt the spotlight to track whichever remote device is located inside the search beam and is closest to the vehicle, and to project light toward the remote device.

* * * * *